April 18, 1961   J. D. KLINE ET AL   2,980,853
COMPONENT OUTPUT CHARACTERISTIC TRACER
Filed April 28, 1958

INVENTORS.
JOSEPH D. KLINE
DONALD E. HOLCOMB, JR.
BY
Knox & Knox

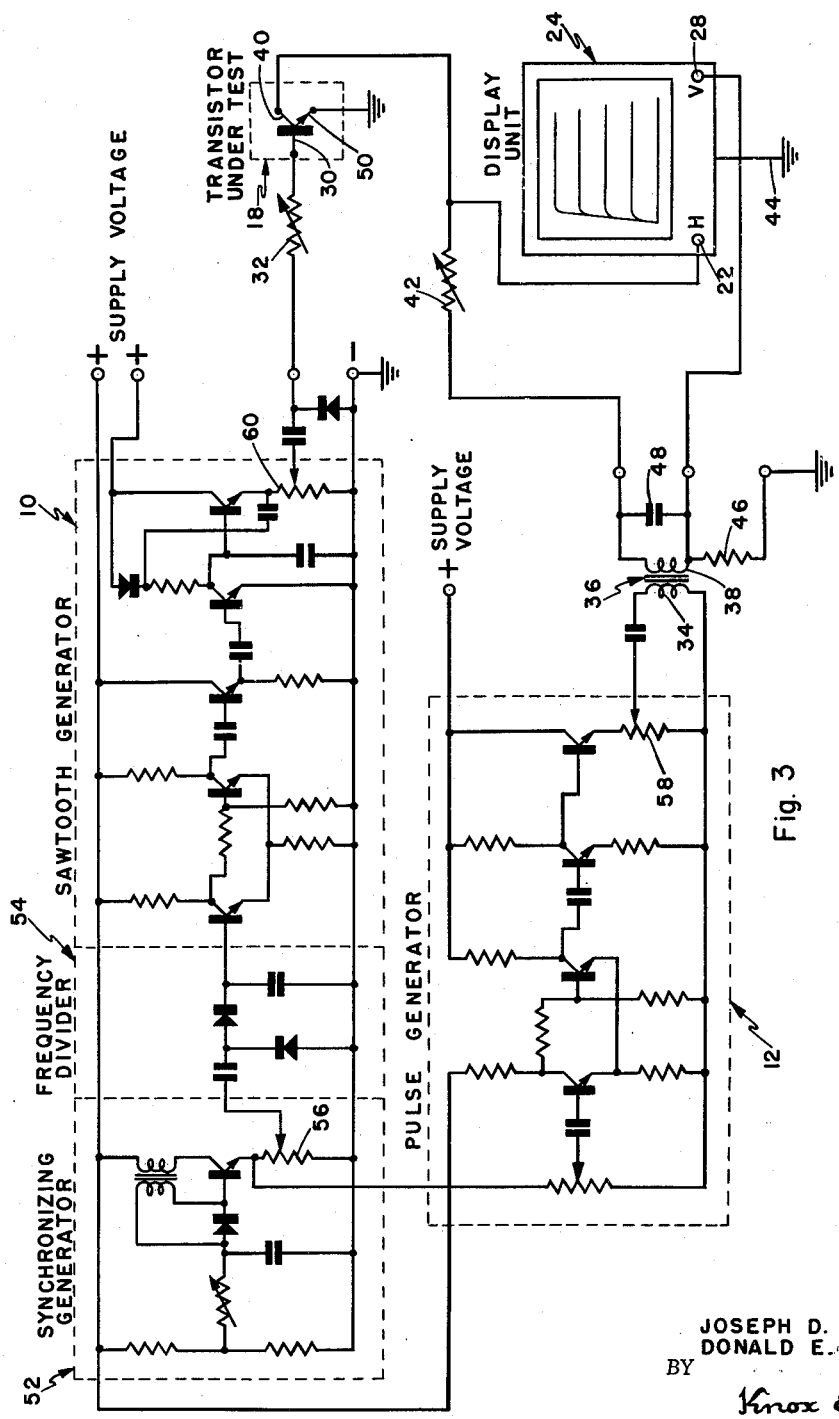

2,980,853

COMPONENT OUTPUT CHARACTERISTIC TRACER

Joseph D. Kline and Donald E. Holcomb, Jr., San Diego, Calif., assignors to Ryan Aeronautical Co., San Diego, Calif.

Filed Apr. 28, 1958, Ser. No. 731,371

3 Claims. (Cl. 324—57)

The present invention relates generally to characteristic analysis of power amplifying components and more particularly to an output characteristic tracer.

Various methods have been evolved for testing performance characteristics of electrical components under different operating conditions. In the conventional apparatus, power of a suitable type is applied to the component under test and performance readings are taken at various values of input power, the readings usually being reproduced visually on an oscilloscope or similar instrument. A major disadvantage of such systems is that the component gradually becomes heated and the operating characteristics change, so that true readings are obtained for a limited time only. Also, the displays obtained are usually brief in nature and difficult to study carefully. The apparatus described herein provides a repetitive, stable display of characteristics at several known performance levels simultaneously, and the display may be studied, measured, or photographed for accurate determination of values. This is accomplished by applying constantly fluctuating power, such as a sawtooth wave, to the input terminals of the component under test and simultaneously applying to the component power input, pulses of power synchronized with the sawtooth wave, so that the resulting display shows the pulsed output of the component at various known stages determined by the character of the sawtooth.

The primary object of this invention is to provide an output characteristic tracer in which a stable, repetitive display is produced showing a family of output characteristics simultaneously, the display in effect being virtually continuous to facilitate study, measurment or recording.

Another object of this invention is to provide an output characteristic tracer which avoids heating of the component under test by utilizing short, repetitive pulses of input power, so eliminating one variable from the operating conditions.

A further object of this invention is to provide an output characteristic tracer which may be adjusted to provide any desired number of output values in the family of characteristics, within a given range, the power input pulses being synchronized with a repetitive variable signal of selected amplitude.

Still another object of this invention is to provide an output characteristic tracer which may be coupled to various types of two-axis display devices such as an oscilloscope, graph recorder, or the like, to obtain temporary or permanent records of the display.

Another object of this invention is to provide an output characteristic tracer which can use electrical, mechanical or combinations of electrical and mechanical elements, and may be used to test many types of devices which produce an output of power different from that applied to the input.

Finally, it is an object to provide an output characteristic tracer of the aforementioned character which is simple and convenient to operate and which will give accurate readings over a wide range of working conditions.

With these and other objects definitely in view, this invention consist in the novel construction, combination and arrangement of elements and portions, as will be hereinafter fully described in the specification, particularly pointed out in the claims, and illustrated in the drawings which form a material part of this disclosure, and in which:

Figure 3 is a complete schematic wiring diagram of the tracer using electronic elements to test a transistor.

Similar characters of reference indicate similar or identical elements and portions throughout the specification and throughout the views of the drawings.

Figure 1:
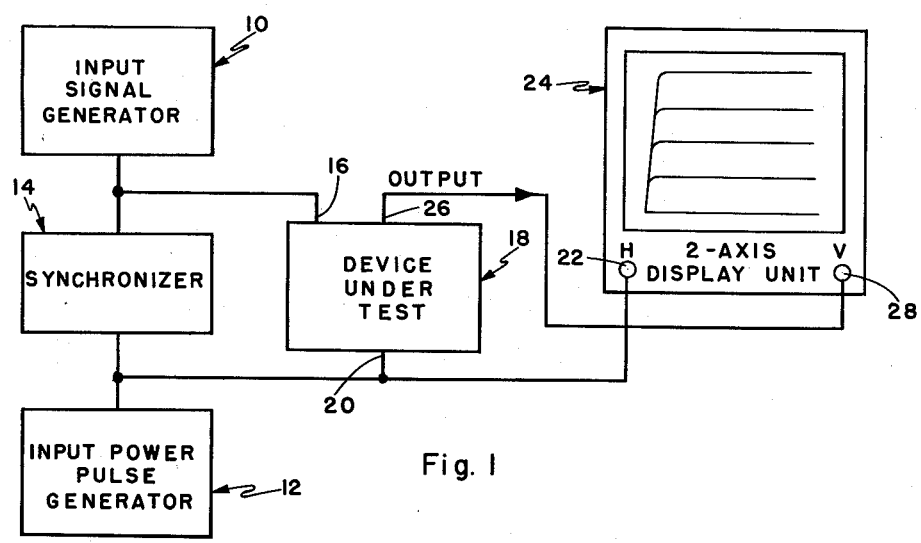
Figure 1 is a block diagram of the tracer coupled to a component under test.

Referring now to Figure 1 of the drawings, the tracer comprises an input signal generator 10, which provides a repetitive, ordinary periodic, variable power such as a sawtooth wave, and an input power pulse generator 12, the two being coupled to a synchronizer 14 so that the pulses may be accurately synchronized with the sawtooth waves. The signal generator 10 is connected to the signal input 16 of the device under test 18 while the pulse generator 12 is connected to the power input 20 of said test device and to the horizontal input 22 of a two-axis display unit 24. The output 26 of the test device 18 is connected to the vertical input 28 of the display unit 24.

To test the device 18, a sawtooth type signal is applied to the signal input 16, while simultaneously pulses of power are applied to the power input 20, the pulses being timed by the synchronizer 14 to occur at predetermined intervals during each sawtooth of signal. On the display unit 24, each output signal is indicated as a rising output on the vertical scale, while each pulse triggers a horizontal representation of the test device output at a particular value of signal input. By timing a number of seperate pulses with each sawtooth signal a group or family of output characteristics is displayed simultaneously and, by repeating the sawtooth at a suitable frequency, the display can be maintained continuously for study. As represented in Figure 1, the generators 10 and 12 and synchronizer 14 may be of various types such as electrical, electro-mechanical or even mechanical units, while the test device 18 may be virtually any device which amplifies an input of suitable power. Such devices could include transistors, vacuum tubes, magnetic or other type amplifiers, servo motors and even hydraulic or pneumatic amplifiers, the various units of the tracer being of suitable type to handle the specific device under test. The display unit 24 may be an oscilloscope, graph recorder or any similar type of unit which provides a visual two-axis display.

Figure 2:
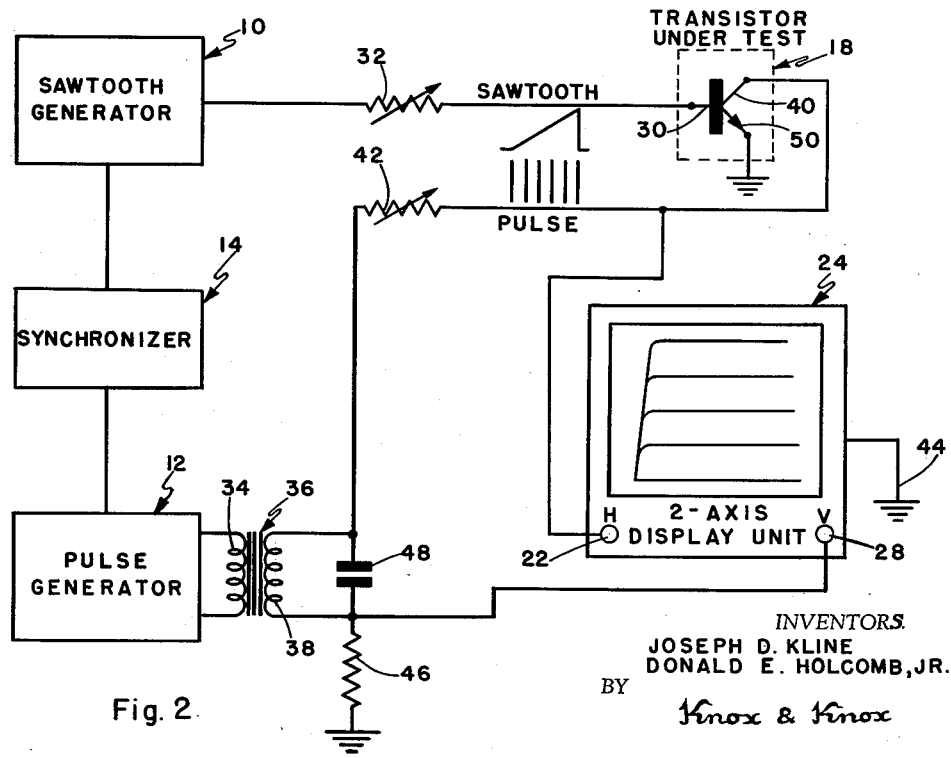
Figure 2 is a partially schematic diagram of the tracer used for testing a transistor.

To illustrate a specific use of the tracer, Figure 2 shows a simplified arrangement of the assembly set up to test a transistor. The sawtooth generator 10 and pulse generator 12 are again coupled by a synchronizer 14 to produce the timed electrical sawtooth signal and power pulses necessary to test the test device or transistor 18. The output of the sawtooth generator 10 is connected to the base 30 of the transistor 18, corresponding to the signal input 16, through a variable resistor which serves as a base current control 32. The pulse generator 12 is connected to the input winding 34 of a collector transformer 36, one side of the output winding 38 of said transformer being connected to the collector 40 of transistor 18, corresponding to the power input 20, and the other side of said output winding being connected to the vertical input 28 of the display unit 24. A variable resistor, which serves as a collector load control 42, is inserted between the collector 40 and the output winding 38, said collector also being connected to the horizontal input 22 of display unit 24 which has a ground connection 44. The end of the output winding 38 connected to the vertical input 28 is also connected to ground through a current resistor 46 and a coupling capacitor 48 is connected from said resistor across said output winding.

The sawtooth generator 10 provides a repetitive sawtooth signal to the transistor base 30, the signal amplitude being adjusted to suit by the base current control 32. At the same time, the pulse generator 12 supplies timed pulses of current, through the collector transformer 36, to the transistor collector 40 and the horizontal input 22 of display unit 24. The voltage across the current resistor 46, which is directly proportional to the transistor collector current, is applied to the vertical input 28, the emitter 50 of the transistor 18 being connected to ground. Thus the voltage appearing across the current resistor 46, which corresponds to the sawtooth signal, furnishes the vertical component of the display and the pulses of current trigger the transistor 18 at timed intervals to provide horizontal traces of the transistor output characteristics at several amplitudes of input signal. Various operating conditions may be simulated by adjusting the collector load control 42 to provide variable collector load resistance.

In this particular assembly, the sawtooth generator 10 and pulse generator 12 may be electro-mechanical or entirely electronic. By way of example, a fully transistorized electronic circuit is shown in Figure 3 in schematic form. In this circuit, a synchronizing generator 52 produces voltage pulses which are fed to a frequency divider 54 and to the pulse generator 12, the synchronizing generator and frequency divider together being comparable to the synchronizer 14. The frequency divider 54 produces pulses which are sub-multiples of the synchronizing generator pulse rate and each sub-multiple pulse triggers one sawtooth wave from the sawtooth generator 10, the output of which is connected to the transistor base 30 as previously described. In the synchronizing generator 52, a variable resistor is used as a divider control 56 to determine the number of pulses which occur in one sawtooth period, the resultant timed pulses being produced by the pulse generator 12 and applied to the transistor collector 40 through the collector transformer 36. Output of the pulse generator 12 is adjusted by means of a pulse amplitude control 58 across the transformer input winding 34. A sawtooth amplitude control 60 is provided in the output of the sawtooth generator 10 and, together with the base current control 32, provides full control and adjustment of the sawtooth signal. The arrangement of the test transistor 18 and display unit 24 are as described in connection with Figure 2, the schematic wiring diagram merely showing one suitable electronic circuit for accomplishing the required results. The circuitry of the various units shown is substantially conventional and well known in the art, and it should be understood that the specific circuits are by no means limiting.

Regardless of the type of equipment used, the resultant display is obtained by supplying a repetitive, variable signal input to the amplifying device under test and triggering the test device with several pulses of power at timed intervals during each sweep of the signal input. A sawtooth type signal is desirable for the power input since this rises gradually from zero to a peak and then drops almost instantaneously back to zero, so ensuring a sharp, well defined trace on the display unit. Since the pulses are accurately timed with regard to the sawtooth signal, each complete sawtooth sweep produces an identical trace or family of characteristics. By adjusting the sawtooth frequency to a suitable rate, a continuous, stable display can be obtained on an instrument such as an oscilloscope, and the display can be measured or studied at length. The tracer is particularly suitable for testing electrical or electronic amplifying devices which are subject to heating under prolonged use. Normally, output characteristics of an amplifying device change considerably with temperature and prolonged testing produces variable results. In the apparatus disclosed herein, the short pulses of power applied to the test device are of insufficient duration to cause heating and even the repetition of many such pulses has a negligible effect. Consequently, the output of the test device remains stable and testing may be continued for extended periods to obtain all necessary information. Also, the amplitude of each pulse may be considerably greater than the normal working capacity of the test device, since the duration of a pulse is insufficient for the high power to damage the device. The use of such high power permits the use of a relatively large scale on the display unit, so that accurate measurements may be made due to a minimum of distortion in the trace.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

We claim:

1. An output characteristic tracer for use in testing a power amplifying device having a signal input, a power input and an output, the tracer comprising: a sawtooth generator connected to supply a constant, repetitive sawtooth signal to the said signal input; a pulse generator connected to supply repetitive pulses of equal power to the said power input; synchronizing means interconnecting said sawtooth generator and said pulse generator and operative to time a constant number of pulses to occur at repetitive selected times during each sawtooth signal; a two-axis display unit having a separate input corresponding to each axis thereof, one of said inputs being connected to the said output to provide a sawtooth trace on one axis, and the other of said inputs being connected to said pulse generator to provide pulse traces on the other axis, whereby a family of pulsed output characteristics is displayed at selected values of the sawtooth signal.

2. An output characteristic tracer for use in testing a power amplifying device having a signal input, a power input and an output, the tracer comprising: a sawtooth generator connected to supply a constant repetitive sawtooth signal to the said signal input, and means for controlling the frequency and amplitude of the sawtooth signal; a pulse generator connected to supply repetitive pulses of equal power to the said power input, and means for setting the frequency and amplitude of the pulses; synchronizing means interconnecting said sawtooth generator and said pulse generator and operative to time a constant number of pulses to occur at repetitive selected times during each sawtooth signal; a two-axis display unit having a separate input corresponding to each axis thereof, one of said inputs being connected to the said output to provide a sawtooth trace on one axis, and the other of said inputs being connected to said pulse generator to provide pulse traces on the other axis, whereby a family of pulsed output characteristics is displayed at selected values of the sawtooth signal.

3. An output characteristic tracer for use in testing a power amplifying device having a signal input, a power input and an output, the tracer comprising: a sawtooth generator connected to supply a constant repetitive sawtooth signal to the said signal input, and means for setting the frequency and amplitude of the sawtooth signal; a pulse generator connected to supply repetitive pulses of equal power to the said power input, and means for controlling the frequency and amplitude of the pulses; synchronizing means interconnecting said sawtooth generator and said pulse generator and operative to synchronize a constant, predetermined number of power pulses occurring at repetitive selected times with each sawtooth signal; a frequency divider operatively connected to said synchronizing means to control the number of power pulses occurring with each sawtooth signal; a two-axis display unit having a separate input corresponding to each axis thereof, one of said inputs being connected to the said output to provide a sawtooth trace on one axis, and the other of said inputs being connected to said pulse generator to provide pulse traces on the other axis, whereby a family of pulsed output characteristics is displayed at selected values of the sawtooth signal.

References Cited in the file of this patent
UNITED STATES PATENTS

| | | |
|---|---|---|
| 2,531,145 | Marco et al. | Nov. 21, 1950 |
| 2,590,116 | Moland et al. | Mar. 25, 1952 |
| 2,616,058 | Wagner | Oct. 28, 1952 |
| 2,833,986 | Golden | May 6, 1958 |

OTHER REFERENCES

Pankove: "Pulsed Curve Tracer for Semiconductor Testing," Electronics, September 1954; pages 172–173.